3,499,721
STABILIZED COMPOSITION OF p-QUINONE-
DIHALOIMINE COMPOUND
Hiroshi Sugiyama, Ashiya-shi, Ryozo Kuriyama, Ibaraki-shi, Otohei Matumoto, Toyonaka-shi, Kunihiko Imada, Sakai-shi, and Yoshio Matsushita, Toyonaka-shi, Japan, assignors to Sumitomo Chemical Company, Ltd., Osaka, Japan, a corporation of Japan
No Drawing. Filed Aug. 17, 1966, Ser. No. 572,913
Claims priority, application Japan, Aug. 13, 1965,
40/50,817, 40/50,818
Int. Cl. D06p 1/32; 3/08
U.S. Cl. 8—32                                  6 Claims

ABSTRACT OF THE DISCLOSURE

A p-quinonedihaloimine is stabilized with an alkali metal phosphate or acetate buffer agent.

---

The present invention relates to a stabilized composition of p-quinonedihaloimine compound.

It is well known that p-quinonedihaloimine compound is useful for dyeing hydrophobic fibers or moulded product of synthetic resin, such as polyolefin. However, this compound is unstable and has a tendency to decompose during production, storage and dyeing, particularly, in the presence of water.

Further the compound decomposes vigorously at a higher temperature than 120° C. in the refined state, and it has a toxicity to skin, for example it causes eruptions.

The present inventors have discovered that the stability of p-quinonedihaloimine compound is remarkably improved by adding a buffer agent such as alkali metal phosphates and alkali metal acetate to maintain the pH-value of a solution from 5 to 8.

One object of the present invention is to provide a method for stabilizing p-quinonedihaloimine compound. Another object is to provide a stabilized composition of p-quinonedihaloimine compound in the form of, for example, paste, granules, dry powder and suspension. Another object is to provide a process for producing such compositions. Further objects will be apparent from the following description.

In order to accomplish these objects, the present invention provides a composition consisting of a p-quinonedihaloimine compound of the formula,

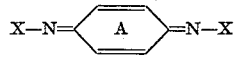

wherein X represents a halogen atom chosen from chlorine and bromine and nucleus A may be substituted with methyl, methoxy or a halogen atom chosen from chlorine and bromine, and at least one buffer agent chosen from alkali metal phosphates and alkali metal acetates, which maintain the pH-value of an aqueous solution at 5 to 8, and if required, the said composition containing a dispersing agent, and an inert agent, and the said composition being in the form of paste, granules, dry powder and suspension.

The p-quinonedihaloimine compound is easily obtained by known method, for example, by oxidizing the corresponding para-phenylenediamine compound with sodium hypochlorite, or calcium hypochlorite.

The p-quinonedihaloimine compound employed in the present invention includes, for example, 1,4-benzoquinonedichlorimide, 1,4 - benzoquinonedibromimine, and 2-methyl-, 2-methoxy-, 2-chloro-, 2-bromo-, 2,5-dimethyl-, 2,5-dichloro-, 2,6-dichloro-, 2,6-dibromo, 2,3,6-trichloro-, 2,3,5,6-tetrachloro-derivatives thereof.

The buffer agent employed in the present invention includes, for example, disodium hydrogenphosphate, dipotassium hydrogenphosphate, sodium dihydrogen phosphate, potassium dihydrogenphosphate and sodium acetate and mixtures thereof which maintains the pH value of an aqueous suspension of the composition at 5–8.

The buffer agent may be employed as either anhydrous crystal or hydrous crystal and also as an aqueous solution in case the composition is an aqueous dispersion.

The storage stability of p-quinonedihaloimine compound is improved somewhat by the addition of a trace amount of the buffer agent, however, it is preferable that the buffer agent is added to the p-quinonedihaloimine compound in an amount of from 1% to 100% by weight based on the weight of the p-quinonedihaloimine compound, and practically a suitable storage stability may be obtained by the addition of the buffer agent in an amount of from 5% to 10% by weight based on the weight of p-quinonedihaloimine compound.

It is desirable that the amount of the buffer agent added is varied depending upon the kind or concentration of the p-quinonedihaloimine compound in the composition, and further depending upon the other components present such as dispersing agent.

When the present composition is used for the purpose of dyeing, the buffer agent contained in the composition also works as a dyeing assistant in the dyeing bath, and it is not necessary to add a dyeing assistant of this kind during dyeing, if enough of the buffer agent has been added previously to the composition, and as a result of this fact compositions of this invention are convenient for later practical use. From these views of the stabilizing action thereof and of the practical use, it is preferable that a large amount of a buffer agent is added in the composition.

In case granules are made, the added amount of the anhydrous metal phosphate must be varied depending on the amount of the water contained in the paste of the p-quinonedihaloimine.

The composition of the present invention may be obtained by merely mixing the said p-quinonedihaloimine compound and the buffer agent. The buffer agent may be added to the quinonedihalimide compound at any convenient time, that is, before the reaction for the synthesis of p-quinonedihaloimine compound, during the reaction, before the isolation of the product after the reaction is over, at the isolation of the product, for example, by washing the product in a filter with a buffer agent aqueous solution, or during mixing of the product with a dispersing agent or during peptizing. Further the buffer agent may be added during or after milling the p-quinonedihaloimine compound.

It is advantageous that the pH of the suspension or the paste of the p-quinonedihaloimine compound is nearly neutral prior to mixing with the buffer agent, and it is preferable, if necessary, that the p-quinonedihaloimine compound is purified or neutralized before adding the buffer agent.

For the purpose of using the present composition for dyeing, a composition is produced in the form that the p-quinonedihaloimine compound is well dispersed in water, and therefore it is necessary that the composition is well mixed or peptized with a suitable dispersing agent in a wet or dry process according to a known manner.

The various kinds of dispersing agents, such as anionic or nonionic surfactant may be employed without affecting the stability of the composition. Examples of the dispersing agents include formalin condensation product of alkylnaphthalenesulfonic acid, salts of alkylbenzenesulfonic acid or alkylnaphthalenesulfonic acid, a sulfuric acid esters of polycondensation product of ethylene oxide and alcohols or alkylphenols, sulfuric acid esters of higher alcohols, ligninsulfonate, and alkylphenyl ethers of polyethyleneglycol. Among these dispersing agents, the formalin condensation product of alkyl naphthalenesulfonic acid is especially preferable. The present composition may further contain an inorganic or organic water-soluble adding agent, which preferably, gives a neutral aqueous solution of the present composition, for example, sodium sulfate, sodium chloride, cane sugar, dextrin and carboxymethyl cellulose.

According to the present invention the paste is prepared by mixing the wet p-quinonedihaloimine compound, the buffer agent, and if necessary, the dispersing agent and adding agent, in an optional order.

The paste prepared by mixing in the presence of water has a high caking property and can not be made into granules of the composition by the mere addition of various water-soluble adding agent in order to increase the viscosity thereof.

And in case the p-quinonedihaloimine compound is mixed with a wetting agent such as alcohol in the absence of water, a paste having a low caking property may be obtained, however, the composition is not readily dispersible in water and therefore is not desirable for practical use.

The above difficulty in the process of formation of granules of the composition due to the caking property is overcome by the procedure wherein all or part of the buffer agent is added in an anhydrous form, such as anhydrous sodium or potassium dihydrogenphosphate, anhydrous disodium or dipotassium hydrogenphosphate, which is useful as a stabilizer. When the anhydrous metal phosphate is added into the aqueous paste containing a p-quinonedihaloimine compound, a dispersing agent and an adding agent and well mixed, the caking property of the paste gradually disappears and the composition becomes suitable for making granules.

The reason for the above phenomena is considered to be that all or a part of the employed anhydrous metal phosphate gets water from the paste as crystal water thereby changing to hydrous metal phosphate, raising the viscosity of the composition, and decreasing the caking property thereof.

The method for making granules of the composition according to the present invention is as follows. A wet paste of a p-quinonedihaloimine compound, a dispersing agent, and an alkali metal phosphate the whole or a part of which is anhydrous are placed in a kneader in optional order and thereafter the mixture is made well mixed, and thereafter the mixture is made into granules by various kinds of extruder type granulator and then dried. Further, if necessary, the granules are sifted.

The granules of the composition are dried very easily because the granules are porous and have a very large surface area.

The powder of the present composition may be prepared by mixing dried and powdered p-quinonedihaloimine compound with the buffer agent and if necessary further with a dispersant and other adding agent, or by drying the paste of the present composition, or the paste for the granules and then pulverizing the thus obtained dry cake or pulverizing the granules by use of a mill.

The suspension of the present composition may be prepared by mixing water, a p-quinonedihaloimine compound and a buffer agent and, if necessary, further a dispersant and an adding agent, or by adding and mixing water to the paste of the present composition.

The stability of the composition of the present invention may be measured by a quantitative analysis of the p-quinonedihaloimine compound in the course of the elapse of time.

The p-quinonedihaloimine compound contained in the present composition is more stable than the free p-quinonedihaloimine compound itself. For example, the paste of the present composition is substantially stable for three months at room temperature, while the wet p-quinonedihaloimine compound cake which contains no buffer agent is almost decomposed during the storage of three months, even when pH of water suspension prepared from it is in the range of 5–8 at the start of its storage.

The following examples are given merely for the purpose of illustration and it is not intended to limit the scope of the invention to the examples. Parts and percent are by weight.

EXAMPLE 1.—PASTE

Formulation

TABLE 1

| Ingredient | Sample No. | | | |
| --- | --- | --- | --- | --- |
| | 1 | 2 | 3 | Control |
| | Parts | | | |
| Quinonedichlorimine (wet) | [1] 5.0 | [1] 5.0 | [1] 5.0 | [1] 5.0 |
| NaH$_2$PO$_4$·2H$_2$O | 1.3 | 0.1 | 0.05 | 0 |
| Na$_2$HPO$_4$·12H$_2$O | 3.7 | 0.4 | 0.2 | 0 |
| H$_2$O (contained in the above wet quinonedichlorimine) | 5.0 | 5.0 | 5.0 | 5.0 |

[1] As pure compound.

The above ingredients were mixed to form paste according to the known procedure.

(Stability)

As shown in the Table 2 the stability of the paste of the present invention is very superior to the paste containing no buffer agent. These effects are not disturbed by the addition of dispersing agent, such as the formalin condensation product of alkylnaphthalenesulfonic acid, and of an inert agent, such as carboxymethylcellulose.

TABLE 2

| Sample No. | pH of water suspension prepared from the paste | Temperature | Depression of purity percent of quinonedichlorimine stored time | | | |
| --- | --- | --- | --- | --- | --- | --- |
| | | | 30 min. | 1 hr. | 2 weeks | 3 months |
| 1 | 6.5 | Room temp | 0 | 0 | 1 | 5 |
| | | 110° C | 0 | 0.5 | | |
| | | 120° C | 5.5 | 10.5 | | |
| 2 | 6.5 | Room temp | 0 | 0 | 1 | 5 |
| 3 | 6.0 | do | 0 | 0 | 1 | 6 |
| 4 (control) | 4.7 | do | 0 | 0 | 33 | [2] Decomp. |
| | | 110° C | 4.8 | 14.8 | | |
| | | 120° C | 13.2 | [2] Decomp. | | |
| 5 [1] | 6.0 | Room temp | 0 | 0 | 5 | 30 |

[1] The paste of No. 4 (control) is neutralized to pH 6.0 by Na$_2$CO$_3$, that is, without buffer agent.
[2] Decomp. means decomposition.

EXAMPLE 2.—PASTE (Formulation)

| Ingredient: | Parts |
| --- | --- |
| Quinonedichlorimine (wet—as pure compound) | 5.0 |
| CH$_3$COONa·3H$_2$O | 4.0 |
| CH$_3$COOH | 0.1 |
| H$_2$O (contained in the above wet quinonedichlorimine) | 5.0 |

The above ingredients were mixed to form paste according to the known procedure.

(Stability)

Same good stability was observed here as was shown in Table 2, Sample No. 1.

The above ingredients were well dispersed to form suspension.

(Stability)

TABLE 4

| Formulation | pH | Temperature | Depression of purity percent of quinonedichlorimine stored time | | | | |
|---|---|---|---|---|---|---|---|
| | | | 30 min. | 1 hr. | 2 hrs. | 3 hrs. | 1 wk. |
| Water suspension prepared. | 7.2 | Room temp | 0 | 0 | 0 | 0 | 3 |
| | | 70° C | <0.5 | <0.5 | <0.5 | <0.5 | |
| | | 80° C | 2.0 | 2.5 | 3.5 | 5.0 | |
| | | 90° C | 3.0 | 3.5 | 8.0 | 11.0 | |
| Control [1] | 9.4 | Room temp | 0 | 0 | 0 | <0.5 | 35 |
| | | 70° C | 2.7 | 5.5 | 9.7 | 18.8 | |
| | | 80° C | 10.0 | 15.1 | 30.8 | 42.2 | |
| | | 90° C | 71 | 92 | | | |

[1] Control means that the formation does not contain a buffer agent. As shown in Table 4, the stability of the water suspension of the present invention is superior to the water suspension containing no buffer agent.

EXAMPLE 3.—GRANULES (Formulation)

Ingredient: Parts
- Quinonedichlorimine _____ 5.0
- $H_2O$ _____ 5.0
- Formalin condensation product of alkylnaphthalenesulfonic acid _____ 5.0
- $NaH_2PO_4 \cdot 2H_2O$ _____ 1.3
- $Na_2HPO_4$ (anhydrous) _____ 3.7

The above ingredients were mixed powerfully to give gradually a wet powder of low caking property. And the wet powder was changed to granules with a granulater and dried at a temperature of from 70° C. to 90° C., to obtain granules which dispersed well in water and were stable.

(Stability)

TABLE 3

| Formulation | pH of water suspension prepared from the granules | Temperature | Depression of purity percent of quinonedichlorimine stored time | |
|---|---|---|---|---|
| | | | 2 weeks | 3 months |
| Granules prepared | 7.2 | Room temp | 0 | <0.5 |
| Control [1] | 6.0 | Room temp | <0.5 | 5 |

[1] Control means that the formulation does not contain a buffer agent. As shown in the Table 3, the stability of the granules of the present invention is superior to the granules containing no buffer agent.

EXAMPLE 4.—WATER SUSPENSION (Formulation)

Ingredient: Parts
- Quinonedichlorimine _____ 50
- $NaH_2PO_4 \cdot 2H_2O$ _____ 3.3
- $Na_2HPO_4 \cdot 12H_2O$ _____ 8.3
- Formalin condensation product of alkylnaphthalenesulfonic acid or sodium lignin sulfonate _____ 8.3
- $H_2O$ _____ 100

EXAMPLE 5.—DRY POWDER (Formulation)

Ingredient: Parts
- Quinonedichlorimine _____ 5
- $H_2O$ _____ 5
- $NaH_2PO_4 \cdot 2H_2O$ _____ 1.3
- $Na_2HPO_4 \cdot 12H_2O$ _____ 3.7

The above ingredients were well mixed to form a paste. The paste was dried and pulverized to form a dry powder.

TABLE 5

| Formulation | pH of pension prepared from the dry powder | Temperature | Depression of quinonedichlorimine stored time (2 months) |
|---|---|---|---|
| Dry powder prepared | 7.2 | Room temp | 0 |
| Control | 9.4 | do | 5 |

As shown in Table 5, the stability of the dry powder of the present invention is superior to the dry powder containing no buffer agent.

EXAMPLE 6

(Formulation)

Quinonedichlorimine derivatives, listed in Table 6, were formulated into water suspension as was shown in Example 4.

TABLE 6

| Quinone-dichlorimine derivatives | Buffer agent | pH of the water suspension | Temperature (° C.) | Depression of purity percent of quinonedichlorimide derivatives stored time | |
|---|---|---|---|---|---|
| | | | | 30 min. | 2 hrs. |
| 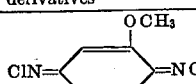 | With | 7.2 | 70 | <0.5 | <0.5 |
| | Without | 9.4 | 70 | 2.6 | 9.5 |
| 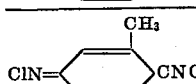 | With | 7.2 | 70 | <0.5 | <0.5 |
| | Without | 9.4 | 70 | 2.5 | 8.0 |
| 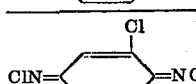 | With | 7.2 | 70 | <0.5 | <0.5 |
| | Without | 9.4 | 70 | 3.0 | 10.5 |
| 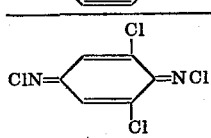 | With | 7.2 | 70 | <0.5 | 1 |
| | Without | 9.4 | 70 | 3.5 | 13.0 |

As shown in Table 6, the stability of the water suspension of the present invention is superior to stability of the water suspension containing no buffer agent.

What we claim is:
1. A composition consisting essentially of a p-quinonedihaloimine compound of the formula,

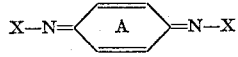

wherein X represents a halogen atom chosen from chlorine and bromine and nucleus A may be substituted with methyl, methoxy or a halogen chosen from chlorine and bromine and an effective amount of at least one buffer agent chosen from alkali metal phosphates and alkali metal acetates, which maintains the pH-value of an aqueous solution at 5 to 8.

2. A composition according to claim 1, wherein the composition further contains a dispersing agent.

3. A composition according to claim 1, wherein the composition further contains an inert agent.

4. A composition according to claim 1, wherein the p-quinonedihalomine compound is chosen from 1,4-benzoquinonedichlorimine and 1,4 - benzoquinonedibromimine and 2-methyl-, 2-methoxy-, 2-chloro-, 2-bromo-, 2,5-dimethyl-, 2,5-dichloro-, 2,6-dichloro-, 2,6-dibromo-, 2,3,6-trichloro- 2,3,5,6-tetrachloro-derivatives thereof.

5. A composition according to claim 1, wherein the buffer agent is chosen from disodium hydrogenphosphate, dipotassium hydrogenphosphate, sodium dihydrogenphosphate, potassium dihydrogenphosphate and sodium acetate and mixtures thereof.

6. A composition according to claim 1, wherein the composition is in the form of paste, granules, dry powder or water suspension.

References Cited

FOREIGN PATENTS 24,658  2/1964  Japan.

NORMAN G. TORCHIN, Primary Examiner

J. E. CALLAGHAN, Assistant Examiner

U.S. Cl. X.R.

260—396